May 23, 1939.  E. REICHERT  2,159,710
SUNGLASS ATTACHMENT FOR EYEGLASSES
Filed March 24, 1936
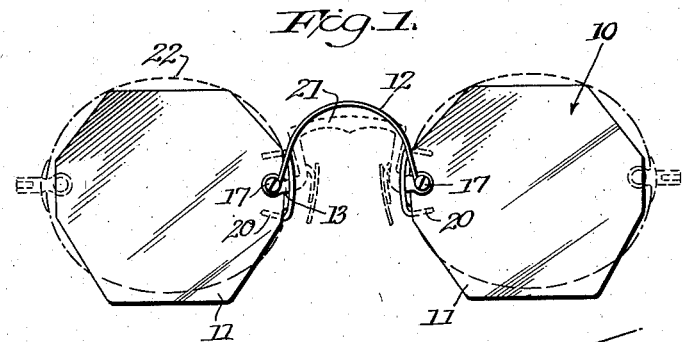
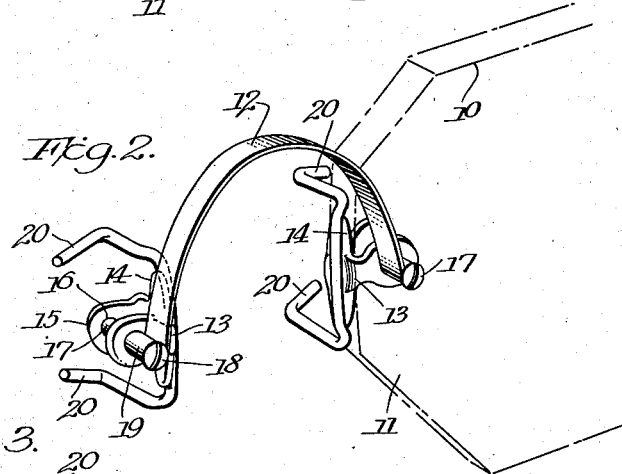
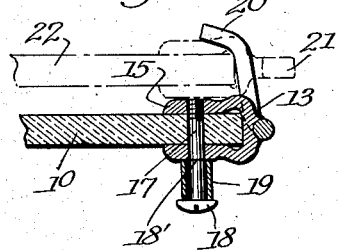
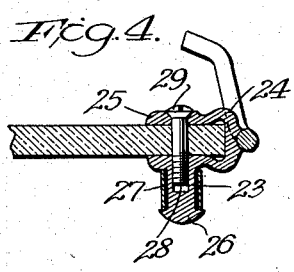
Inventor
Ellsworth Reichert
By Cushman, Darby & Cushman
Attorneys Patented May 23, 1939

2,159,710

UNITED STATES PATENT OFFICE 2,159,710

SUNGLASS ATTACHMENT FOR EYEGLASSES

Ellsworth Reichert, Baltimore County, Md., assignor, by mesne assignments, to Liberty Optical Company, Inc., Baltimore, Md., a corporation of Maryland Application March 24, 1936, Serial No. 70,687

5 Claims. (Cl. 88—41)

This invention relates to improvements in eyeglasses and refers particularly to a cover or sunglass attachment for eyeglasses.

An object of the invention is to provide cover glasses wherein the lenses are connected together by a mounting having means for permitting the glasses to be easily and quickly attached to a pair of regular or permanent eyeglasses.

Another object is the provision of cover or sun lenses flexibly connected by a bow-spring, whereby the lenses may readily adjust themselves, without restraint from the bow spring, to the permanent glasses with which they are used.

A further object contemplates a lens mounting wherein the bow-spring post has the double function of connecting one of the lenses to the bow-spring and clamping the lens to the mounting.

In addition to constituting sunglasses, my invention may be used as correction lenses and also with distance glasses so as to provide reading glasses.

With the foregoing and other objects in view, the invention will now be more particularly described, reference being had to the accompanying drawing, in which:

Figure 1 is a front elevation of one form of my cover or sun glasses applied to a pair of permanent glasses;

Figure 2 is an enlarged fragmentary view of the cover glasses shown in Figure 1;

Figure 3 is a horizontal section through the lens mounting shown in Figure 2; and Figure 4 is a sectional view of a modified form of lens mounting.

Referring to the drawing, the numeral 10 designates generally my cover or sunglasses and comprises lenses 11 connected together by a bow-spring 12. Each lens is carried by a lens mounting 13 engageable with the inner edge of the lens. This mounting comprises a longitudinal bar 14 directly engaging the central portion of the inner edge of the lens and having spaced clamping arms 15 embracing the lens and between which the lens is clamped. These arms are provided with aligned openings 16, one of which is screw threaded and both of which align with a like opening in the lens. A combined bowspring post and clamping screw 17 is adapted to pass through the several openings and is provided adjacent one end thereof with threads which engage the threads of the opening 16 and thereby clamp or secure the lens to the mounting 13. The other end of the post 17 is provided with a head 18 and a shouldered portion 18' which extends outwardly from the mounting sufficiently to permit one extremity of the bow-spring 12 to be pivotally mounted thereon. To produce this connection, each extremity of the bow-spring is return bent to form an eye 19 which encompasses the post and freely rotates thereon. The inner end of the shoulder 18' bears against one of the clamping arms and facilitates in the clamping of the lens to the mounting.

Each of the bars 14 is extended laterally at both ends to form permanent glass engaging hooks 20, which project from the mounting on the side opposite from the post 17 and are offset from each other.

A pair of cover glasses formed in this manner may be easily and quickly applied to a pair of permanent glasses 21 by flexing or contracting the bow-spring 12 until the hooks 20 of each lens mounting clear the inner edges of the lenses 22 of the permanent glasses. The lens mountings 13 with the hooks 20 may then be inserted between the lenses 22 and the tension on the bow-spring 12 released. This action permits the hooks 20 to move outwardly into contact with the permanent lenses and thereby detachably secures the cover glasses thereto. By reason of the lenses and bow-spring posts being freely rotatable with respect to the bow spring, the lenses may adjust themselves, without any restraint from the bow-spring, to the permanent glasses 21, the hooks 20 seating themselves freely and automatically to the edges of the permanent glasses.

Referring now to Figure 4, there is illustrated a modified form of the invention wherein the bow-spring post 23 is formed integral with the lens mounting 24. In this form the mounting is provided with the usual clamping arms 25, and from one of these arms projects the integral bow-spring post 23. This post is provided with a head 26 for the purpose of retaining one end of the bow-spring 27 upon the lens mounting. This portion of the bow-spring is bent to form an eye similar to that shown in Figures 2 and 3 to permit the bow-spring to rotate freely upon the post 23. For securely clamping the lens to the mounting 24, the post 23 is provided with a screw threaded recess 28 for receiving the threaded end of screw 29. This screw passes through a suitable opening in the adjacent clamping arm 25, to permit the lens to be securely clamped to the mounting when the screw is threaded in the opening 28. In other respects the structure is the same as that shown in Figures 1 to 3.

It will be understood that the invention is not limited to the details of construction shown in the drawing, and that the examples of the use of the device which have been given do not include all of the uses of which it is capable, and that the phraseology employed in the specification is for the purposes of description and not of limitation.

I claim:

1. A lens mounting for cover glasses comprising a lens clamp, a bow-spring post integral with and extending from said clamp at one side thereof, permanent glass engaging means extending from said clamp on the side opposite said post, and a bow-spring having one end thereof connected to said post and freely rotatable thereon.

2. Cover glasses comprising lenses, lens clamps each having a bow-spring post extending from one side thereof in a plane transverse to the plane of the lenses, permanent glass engaging means extending from the opposite side of each clamp, and a bow-spring having its ends connected with said posts and freely rotatable thereon whereby the lenses may readily adjust themselves to the permanent glasses without restraint from the bow-spring.

3. Cover glasses comprising lenses, lens clamps each comprising a pair of spaced connected arms between which a lens is clamped, a bow-spring post extending from one arm of each clamp, permanent glass engaging means extending from each clamp on the side opposite said post, and a bow-spring having its ends connected with said posts and freely rotatable thereon, whereby the lenses may readily adjust themselves to the permanent glasses without restraint from the bow-spring.

4. A lens mounting for cover glasses comprising a lens clamp including a pair of spaced connected arms between which a lens is adapted to be clamped, a bow-spring post extending from one arm, permanent glass engaging means extending from said clamp on the side opposite said post, and a bow-spring connected to said post and freely rotatable thereon.

5. A lens mounting for cover glasses comprising a lens clamp including a pair of spaced connected arms between which a lens is adapted to be clamped, a bow-spring post extending from one arm, permanent glass engaging means comprising hooks extending from said clamp on the side opposite said post and laterally offset from one another, and a bow-spring connected to said post and freely rotatable thereon.

ELLSWORTH REICHERT.